Oct. 21, 1930.    J. H. ALLEN    1,778,994

LAWN SPRAY CONTROL DEVICE

Filed Nov. 6, 1929

INVENTOR:—
J. H. ALLEN.
By Martin P. Smith, Atty.

Patented Oct. 21, 1930

1,778,994

UNITED STATES PATENT OFFICE

JOSEPH H. ALLEN, OF ALHAMBRA, CALIFORNIA

LAWN-SPRAY-CONTROL DEVICE

Application filed November 6, 1929. Serial No. 405,202.

My invention relates generally to lawn sprinklers and more particularly to a device for controlling the spray that discharges from lawn sprinkling devices and causing said spray to be directed unto predetermined areas of the lawn or ground.

Among the objects of my invention are, to provide a relatively simple, practical and efficient device that may be conveniently utilized in connection with a generally used spray nozzle for causing the spray that issues from said nozzle to be directed unto desired or predetermined areas, for instance, narrow strips of parking, the edges of lawns, gardens or the like and the lawn or ground immediately adjacent to a building, wall, sidewalk or the like.

Further objects of my invention are, to provide a spray control device that is relatively simple in construction, inexpensive of manufacture, capable of being readily adjusted so as to control and direct the spray that issues from the nozzle with which the device is associated and further, to provide a device of the character referred to that will prevent water wastage as a result of spray from the nozzle falling unto sidewalks, driveways and the like.

A further object of my invention is, to provide a spray control device that may be easily and quickly applied to or removed from a water spray nozzle that is readily obtainable in the open market and which is now generally used for spraying lawns.

With the foregoing and other objects in view, my invention consists in certain novel features of construction and arrangement of parts that will hereinafter be more fully described and claimed and illustrated in the accompanying drawings, in which:

Fig. 1 is an elevational view of a spray control device of my improved construction and graphically illustrating the lines of discharge of spray from said device.

Fig. 2 is a top plan view of my improved lawn spray control device.

Fig. 3 is a side elevational view of the device with dotted lines showing the wings or deflectors swung upwardly and outwardly into nondeflecting positions.

Fig. 4 is an elevational view of the device and looking against the rear face thereof.

Fig. 5 is a top plan view of the central portion of the device and showing a standard form of spray nozzle positioned therein.

Fig. 6 is a perspective view of one of the wings or deflectors of the device.

Fig. 7 is an enlarged cross section taken approximately on the line 7—7 of Fig. 2.

Referring by numerals to the accompanying drawings which illustrate a practical embodiment of my invention, 10 designates the base of the device, which is preferably constructed of sheet metal in the form of a channel having a straight flat bottom 11 and vertically disposed parallel side walls 12.

The intermediate portion of one of the side walls is provided with vertically disposed slits 13 and the material between these slits is pressed inwardly a slight distance so as to form a vertically disposed resilient tongue 14 that occupies a position just inside and parallel with the side wall from which said tongue is formed.

The central portion of this tongue is cut away to form a notch 15 for the accommodation of the tubular neck portion N of a standard or generally used form of spray nozzle S, having twin jet openings O.

Formed on this nozzle on the side opposite from the tubular neck N are depending lugs L, that function as feet for supporting the nozzle and these lugs project through openings 16 that are formed in the bottom plate 11.

The intermediate portion of the side wall opposite to the wall from which the tongue 14 is formed is provided with vertically disposed slits 17 and the material between said slits is bent inwardly to form a resilient tongue 17ª that occupies a vertical position just inside and parallel with the wall from which it is formed. The upper edges of both tongues 14 and 17ª are bent inwardly to form narrow inclined lips 18.

The side of nozzle S opposite the side from which the tubular neck N projects, occupies a position directly against the lower portion of the tongue 17ª and thus when the spray nozzle is positioned in the channel shaped body 10, it is firmly retained by the lower portions of the resilient tongues 14 and 17ª.

Placed outwardly from the intermediate portion of tongue 17ª is a small ear 19 that provides a stop for limiting the downward movement of the inner ends of the wings or deflectors that are pivoted to the side wall from which tongue 17ª is formed and the tubular neck N on the opposite side of the device performs the functions of a stop to limit the downward swinging movement of the inner ends of the wings or deflectors that are pivoted to the wall from which tongue 14 is formed.

Pivotally secured to both ends of the side walls 12 by means of rivets 20 are the lower outer ends of the spray deflecting wings and each wing is formed from suitable sheet metal and comprises a vertically disposed wall 21 that tapers in width towards its inner end and a portion of said wall adjacent to its upper end is bent inwardly at right angles to form a relatively narrow inclined deflector 22 that tapers in width toward its inner end. Depending from the inner edge of this deflector 22 is a relatively narrow deflector 23 that gradually tapers in width toward its inner end and this deflector 23 occupies a substantially longitudinal plane that is slightly inclined with respect to the outer wall 21 of the deflector.

The rear or outer end of the depending deflector 23 is bent outwardly toward the wall 21 so as to form a relatively small triangular deflector 24.

The inner lower corners of the side walls 21 of the deflecting members are cut away as designated by 25 for the accomodation of the tubular neck end and for the ear 19 and which parts, as hereinbefore stated, function as stops to limit the downward movement of the inner ends of the deflectors and so as to correctly position said deflectors upon the channel shaped body 10.

When my improved spray control device is utilized for directing spray from a nozzle throughout a relatively narrow area of ground, for instance, the parking between the street curb and sidewalk or an elongated narrow area in a lawn or garden, the wings or deflecting members are swung inwardly and downwardly to their limit of movement so as to occupy the positions as illustrated in Figs. 1, 2 and 3.

A lawn hose is connected to the tubular nipple end and when the water is turned on it will discharge in spray form through the openings O of the twin nozzle S. A certain amount of this spray will discharge upwardly and outwardly without interference and pass through the elongated diamond shaped opening that is formed between the four wings or deflectors and this spraying will discharge upwardly and outwardly from the ends of the device so as to fall on narrow portions of the lawn some fifteen to twenty feet away from said device.

Other portions of the spray from the nozzles will pass outwardly and upwardly between the side walls 21 and the depending flanges 23 and these portions of the spray will discharge outwardly from the ends of the device onto the narrow areas just outside those areas that are covered by the spray that discharges directly from the jet openings O of the nozzle S, as hereinbefore described.

Portions of the spray that pass between the outer walls 21 and the flanges 23 will strike against the small triangular deflectors 24 at the outer ends of the flanges 23 and this spray will be directed throughout narrow areas immediately adjacent to the ends of the device.

Thus it will be seen that the wings or deflectors, when closed on the body of the device, are effective in causing the spray that issues from the nozzles within the device to cover relatively narrow areas of lawn or ground immediately adjacent to and in longitudinal alignment with the body of the device and by properly locating said body on the water issuing from the nozzle in the form of spray may be caused to fall on predetermined narrow strips of lawn or ground and no portion of the discharged water will be wasted as a result of falling on a pavement, sidewalk, driveway or the like.

Inasmuch as the wings or deflectors are pivoted to the ends of the body 10, said wings or deflectors may be readily swung upward and outward into the positions shown by dotted lines in Fig. 3 and by proper manipulation of said wings or deflectors, predetermined areas of lawn or ground to either or both sides of the device, as well as areas to the ends thereof, may be sprayed from the nozzle positioned within said device.

By locating the spray control device immediately adjacent to a building wall or flower bed and closing the deflectors or wings that are adjacent to said wall or bed and opening the wings or deflectors on the opposite side of the device, the spray will be directed over a considerable area of lawn or ground adjacent to the wall or flower bed without wetting the latter.

To detach the spray nozzle from the control device, it is only necessary to open the wings or deflectors and to pull the nozzle upwardly from its position within the channel-shaped body.

Thus it will be seen that I have provided a lawn spray control device that is relatively simple in construction, inexpensive of manufacture, capable of being readily adjusted so as to direct the spray over different areas immediately adjacent to the nozzle and said control device being very effective in performing the functions for which it is intended.

It will be understood that minor changes in the size, form and construction of the various parts of my improved lawn spray control device may be made and substituted for those herein shown and described without departing from the spirit of my invention, the scope of which is set forth in the appended claims.

I claim as my invention:

1. In a spray control device for lawn sprinklers, a base adapted to receive a spray nozzle and pairs of deflectors pivotally mounted on the ends of said base.

2. In a spray control device for lawn sprinklers, a base adapted to receive a spray nozzle, pairs of deflectors pivotally mounted on the ends of said base and each deflector having a plurality of spray deflecting surfaces.

3. A spray control device for lawn sprinklers, comprising a base, a pair of independently adjustable deflectors pivotally mounted on each end of said base and each deflector having deflecting surfaces that are arranged substantially at right angles to each other.

4. In a spray control device for lawn sprinklers, a base, a pair of independent operable spray directing members pivotally mounted on each end of said base and each spray directing member comprising a side wall and inclined deflectors formed on the upper portion of said side wall.

5. A spray control device for lawn sprinklers, comprising a channel-shaped base, the intermediate portion of the side walls of which base are slotted vertically to form resilient tongues, a spray nozzle positioned in the base between said resilient tongues and spray deflectors pivotally mounted on the ends of said base.

6. In a spray control device for lawn sprinklers, a base, a spray nozzle positioned on the center of said base, wings pivotally mounted on the ends of said base and the upper portion of each wing terminating in an inwardly presented inverted channel-shaped member.

7. In a spray control device for lawn sprinklers, a base, a plurality of independently adjustable wings pivotally mounted on said base, each wing comprising a vertically disposed wall and the upper portion of which wall is bent inwardly and thence downwardly to form an inverted channel-shaped member that tapers gradually toward one end.

8. In a spray control device for lawn sprinklers, a channel-shaped base, a sprinkling nozzle mounted at the center of said base and means pivotally mounted on the ends of said base for directing the spray from said nozzle upwardly and outwardly from the ends of said base.

9. In a spray control device for lawn sprinklers, a channel-shaped base, a spray nozzle mounted on the central portion of said base and a pair of oppositely arranged spray deflectors pivotally mounted on the end portions of each side wall of the base.

10. In a spray control device for lawn sprinklers, a channel-shaped base, a spray nozzle mounted on the central portion of said base, a pair of oppositely arranged plates pivotally mounted on the outer ends of each side wall of the base and inclined spray deflectors on the upper portion of each plate.

In testimony whereof I affix my signature.

JOSEPH H. ALLEN.